(12) United States Patent
Colvero et al.

(10) Patent No.: US 7,969,295 B2
(45) Date of Patent: Jun. 28, 2011

(54) DEVICE, SYSTEM AND METHOD FOR THE LOCATION AND IDENTIFICATION OF AS-BUILT PLANTS OF PIPES, CONDUITS, CABLES OR HIDDEN OBJECTS

(76) Inventors: Claiton Pereira Colvero, Rio de Janeiro (BR); Vinicius Rangel Duarte Carneiro, Rio de Janeiro (BR); Alexandre De Oliveira Dal Forno, Rio de Janeiro (BR)

( * ) Notice: Subject to any disclaimer, the term of this patent is extended or adjusted under 35 U.S.C. 154(b) by 481 days.

(21) Appl. No.: 12/046,882

(22) Filed: Mar. 12, 2008

(65) Prior Publication Data
US 2008/0252449 A1 Oct. 16, 2008

(30) Foreign Application Priority Data
Apr. 13, 2007 (BR) ...................................... 0701614

(51) Int. Cl.
*G08B 26/00* (2006.01)
*G08B 13/14* (2006.01)
*G01R 19/00* (2006.01)
(52) U.S. Cl. .................. 340/505; 340/572.1; 340/572.7; 340/572.8; 340/561; 324/66; 324/67
(58) Field of Classification Search .................. 340/505, 340/572.1, 572.7, 572.8
See application file for complete search history.

(56) References Cited

U.S. PATENT DOCUMENTS

| | | | |
|---|---|---|---|
| 3,713,148 A | 1/1973 | Cardullo et al. | |
| 4,873,533 A | 10/1989 | Oike | |
| 5,880,675 A * | 3/1999 | Trautner | 340/572.8 |
| 6,388,575 B1 * | 5/2002 | Galloway | 340/572.1 |
| 6,478,229 B1 * | 11/2002 | Epstein | 235/492 |
| 6,850,161 B1 * | 2/2005 | Elliott et al. | 340/572.1 |
| 7,002,461 B2 | 2/2006 | Duncan et al. | |
| 2001/0043071 A1 * | 11/2001 | Minarovic | 324/326 |
| 2006/0109131 A1 | 5/2006 | Sen et al. | |
| 2007/0115129 A1 * | 5/2007 | Kessler | 340/572.3 |

FOREIGN PATENT DOCUMENTS

MU 8003112-9 10/2001

* cited by examiner

*Primary Examiner* — Donnie L Crosland
(74) *Attorney, Agent, or Firm* — Sughrue Mion, PLLC

(57) ABSTRACT

A device 20 for location and identification of pipes, conduits, cables or buried or hidden objects 8 is described without the need of any invasive and/or destructive work, said device comprising at least one transponder 1 utilizing RFID or like technology for identification without any physical contact or line-of-sight, said transponder 1 being attached in a support 7 shaped as a mesh, tape, wire, cable, cordage or alternatively in a device 32/33 such as a bar, tappet, line, stud, mushroom, pipe, marker or the like, device 20 resulting from the combination of 1 and 7 or of 1 and 32/33. A system for location and identification of said objects 8 comprises said device 20 and further a reading and/or writing unit 3 of the information on said pipe, conduit, cable or buried or hidden object 8, at least an antenna 2 besides said pipe, conduit, cable or buried or hidden object 8. Also described is the method for installing device 20, the method for location and identification of a pipe, conduit, cable or buried or hidden object 8, as well as the method for mapping and execution of as-built plants of pipes, conduits, cable or buried or hidden objects 8 without the need of any invasive and/or destructive work.

5 Claims, 4 Drawing Sheets

FIG. 1A
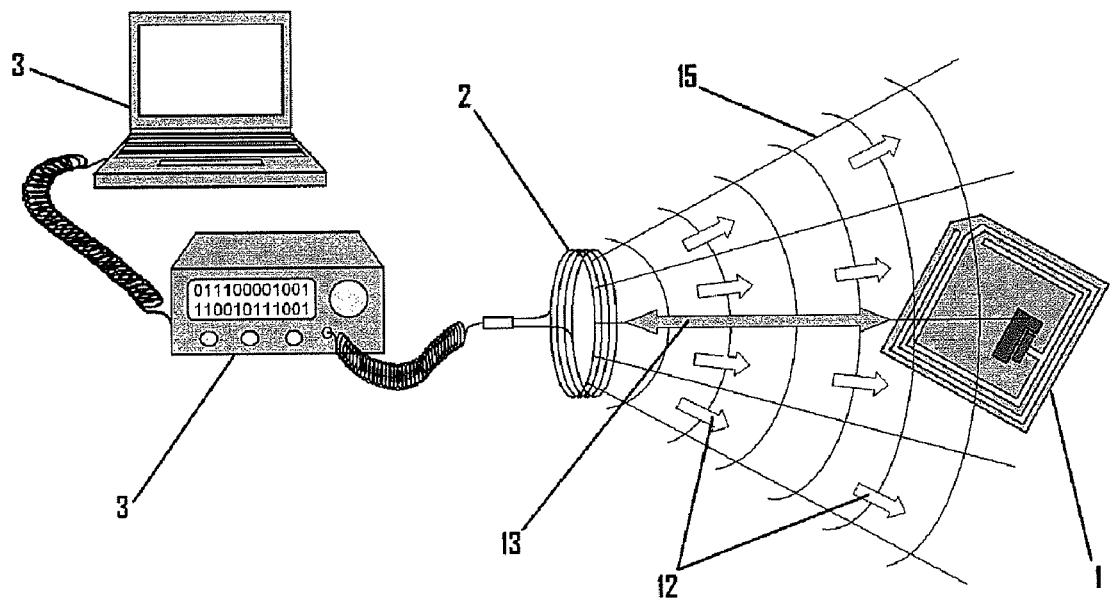
PRIOR ART
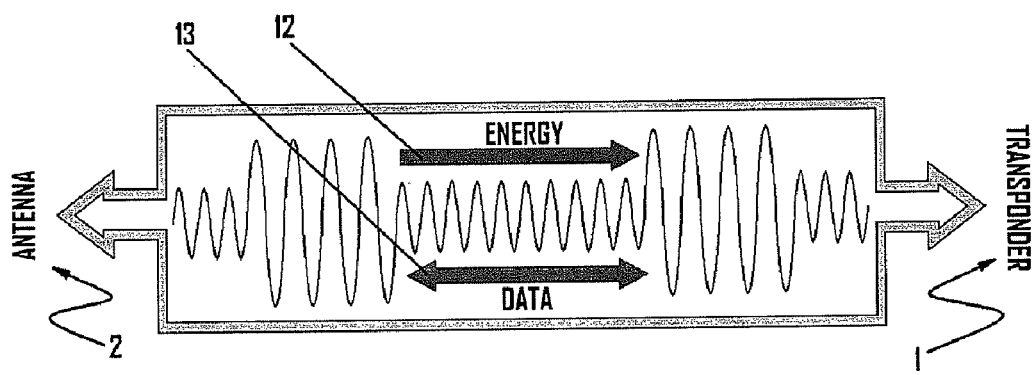
FIG. 1B
PRIOR ART

DEVICE, SYSTEM AND METHOD FOR THE LOCATION AND IDENTIFICATION OF AS-BUILT PLANTS OF PIPES, CONDUITS, CABLES OR HIDDEN OBJECTS

FIELD OF THE INVENTION

The present invention relates to the field of devices, systems and methods for location and identification of pipes, conduits, cables or buried or hidden objects, more specifically, to a system comprising a device for location and identification, said system being instrumented with RFID technology enabling the precise location and identification of said pipes, conduits, cables or other buried or hidden objects and to the method for location and identification of buried and hidden objects with the aid of said device and system.

BACKGROUND OF THE INVENTION

Recently, automatic identification (Auto ID) procedures have become very popular among service companies, buy and delivery logistics, industry, manufacturing companies and material flow systems. Automatic identification procedures aim to provide information on people, animals, goods and products on the way.

In many instances the bar code tags that some time ago started a revolution in terms of identification systems are inadequate. The bar codes are very cheap, but the problem is their low storage ability and the fact that they cannot be re-programmed.

The optimum solution from the technical point of view would be storing the data in a silicon chip. The most common electronic data storage device in use in everyday life is the smart card based on a contact field (intelligent telephone card, bank cards). However, the mechanical contact used in the smart card is many times not practical. Transfer of data between the data carrier device and its reader without the need of physical contact or line-of-sight is much more flexible. Ideally, the energy required for operating the electronic data carrier device would also be transferred from the reader by using contactless technology. In view of the procedures used for energy and data transfer, contactless ID systems are called RFID (Radio Frequency Identification) systems.

RFID—Radiofrequency Identification—is a data storing and collecting technology without the need of physical contact or line-of-sight between the data reader and/or writer and the device or tag which stores such data. Said device can be completely passive, exclusively fed by the magnetic or electromagnetic field emitted by the reader/writer, or active, using its own energy for integrally feeding the device or a portion of its functions. This technology has been at first proposed as a solution for tracking and access control systems in the eighties when the MIT (Massachusetts Institute of Technology), together with other research centers launched the study of an architecture which would employ resources from radiofrequency-based technologies as a reference model for the development of new applications of product tracking and location.

These studies led to the EPC (Electronic Product Code), where by utilizing resources provided by magnetic or electromagnetic signals, architecture for product identification was defined and thereafter called RFID (Radio Frequency Identification).

Besides, recently the contactless and without line-of-sight identification has become an independent interdisciplinary field, which does not belong to any of the conventional fields, since it combines elements of extremely different fields: wireless technology, semiconductors technology, cryptography and data protection, telecommunications, manufacturing technology and many related areas.

Such instrumentation technology employs devices known as transponders, tags, smart tags, instrumentation tags or markers, which are electronic tags, passive, semi-passive or active under the point of view of the feed source with a microchip and flash memory units, EPROM or EEPROM internally installed. These tags can be tracked by the emission of magnetic or electromagnetic fields generally directed using at least one suitable antenna or coil.

U.S. Pat. No. 3,713,148 relates to a device and system utilizing a transponder, the system being of the general type where a base station conveys an interrogation signal to a remote transponder, the transponder responding with an answerback transmission. The transponder includes a changeable or writable memory, and means responsive to the transmitted interrogation signal for processing the signal and for selectively writing data into or reading data out from the memory.

U.S. Pat. No. 4,873,533 refers to a reader and a marker to passively locate buried objects. This document makes explicit use of the RFID technology, citing buried lines as object to be identified, but there is no treatment of the information. The technology is used for location only, not identification. The marker is attached to the object to be identified or by itself in the underground. The functionality of the device is close to that of a metal detector. The marker has no memory and has a coil antenna. The frequency is from 80 to 160 kHz and 1.4 m depth. The patent states the invention comprises the utilization of an external Reader and a marker as a passive (without batteries) locator for buried objects such as gas and water pipes, making easier the excavation to find them. The marker owns the location information and is placed close to the object to be detected by the Reader. The marker has a coil antenna and does not have any memory. There is no identification according to the "bar code" model (identification number); the information offered by the patented system being that there is a buried object. The application of the described object is similar to a metal detector.

The working of the RFID technology is described in its entirety. The horizontal position is determined as the best marker position. The author considers phenomena such as earthquake and soil sedimentation not as harmful to the physical integrity of the equipment, but to the change in its position which will affect the antenna position and will make the marker inactive. The marker is covered with polyethylene and its frequency is from 80 to 160 kHz. The reading distance is up to 1.4 m. The document relates exclusively to location and does not cite identification.

U.S. Pat. No. 6,850,161 refers to mapping and identification of buried objects, including network and data server. In the server the information processing is carried out by marker identification. The technology is directed to location, but it enables identification as well. The markers are attached to the objects to be located. The data bank has the information of the buried objects location by means of the identification number of the markers. The memory is in the data server. The patent cites buried pipes as objects to be identified. The object of the invention includes the mapping and identification of buried objects, including a network and a server, also for making the excavation easier. The data bank has the information on the location of the buried objects through the marker identification number (bar code), that is, the marker identifications are conveyed to the data server which has the location mapping in the memory. Readers and writers read and write the information in the marker and in the data bank. The document cites buried pipes as objects to be identified. This technology is focused on the technology of data transmission and cryptography for long distance transmission of marker information. The marker is only used for providing the identification number(s) to the network.

U.S. Pat. No. 7,002,461 relates to the location of hidden and fixed objects using the RFID technology with transponder and reader. The patent explicitly uses the RFID technology and broadens the application for hidden objects, not necessarily buried. Buried pipes are cited as objects to be identified. It can locate and identify. The marker has a reading/writing memory of 1,024 bits. The marker fixation is not cited, only it is mentioned that it should be closed to the object to be located. A data bank application is mentioned. Frequency: 13.5 MHz to 2.45 GHz and 1.4 m depth.

The object of the patent is the location of fixed and hidden objects through RFID technology using passive (without batteries) transponders (marker) and Reader. The transponders have a memory. The location is performed based on the identifying numbers of the transponders; the Reader warns when it detects the searched transponder. It is alleged that this system can be used for the tracking of objects, location at Latitude and Longitude, Equipment Maintenance, stock logistics and location of buried objects. The ideal operating frequency is 915 MHz, but the operation can be performed in the range from 13.5 MHz to 2.45 GHz.

Published US Application 2006/0109131 deals with various mechanisms, techniques, methods and systems for handling, labeling, detecting, location, providing maintenance, managing and tracking Hidden Objects using RFID technology, portable data processing units, as well as a centralized computer keeping a data base containing information on a plurality of Hidden Objects, those being buried on the surface or hidden in walls or other structures. The invention can be applied to a wide variety of industries including constructions, utility, government, military, waste water management, etc. This publication introduces an identification and location device for Hidden Objects made up of a transponder inserted into a protecting, water-resistant case. However, there is no mention whatsoever to any support, such as a mesh, a tape, a wire, a cordage, a bar, a tappet, a line, a stud, a mushroom, a pipe, a marker or any other element able to support and dispose several aligned transponders forming one single device according to the concept of the present invention. This publication shows yet a method for the location of Hidden Objects by writing and reading the coordinates of these objects in a RFID device, the device being located close or attached to said object. There is also presented a method for locating Hidden Objects based on the triangulation of electromagnetic waves between the reader and several identifying and locating devices disposed along the Hidden Object.

Brazilian Utility Model application MU8003112-9 relates to an underground warning mesh with safety tape for protecting gas, fluids, electric energy, communication lines and water pipes, mainly in urban zones. It is made up of sinuosity areas along its whole length which can increase the lateral areas. Upon demand of the client, it can be welded to a warning tape. The mesh is made up of honeycombs placed lengthwise to improve strength throughout the years. However, this publication does not describe nor suggest the possibility of RFID instrumentation.

Several patents provide solutions for the identification of pipes, conduits or hidden objects, made up of metal or not, all of them having the same motivation, that is, to reduce costs and nuisances caused by excavations and interventions for locating pipes, conduits or buried or hidden objects in urban and rural zones, as well as to reduce the period of time to locate said objects during fluid leakage with risk of serious accidents.

Broadly, it can be seen that the existing technology enables one to identify buried or hidden objects in a general way or it is directed to application in the location of buried or hidden objects using RFID or the like, but none of them applies said technology to a safety and identification device supported on a mesh, tape, wire, cordage, bar, tappet, line, stud, mushroom, pipe, marker or the like as relates to the application.

The more complete present solutions relate to the installation of meshes or warning visual tapes buried on the objects to be identified. Other solutions use warning tapes covered with metallic stock, those being located with the aid of metal detectors, however this is done at the cost of much trouble caused by the several metal objects buried in an urban ambient. In spite of the existence of several techniques, it is practically unknown to combine reduced cost, practical installation, ease of identification of the objects and safety in the information stored in the system. As a result of the huge variety, practicality and low cost offered by its use a new identification method by radio frequency (RFID) has aroused much interest in this field.

Based on such information, the Applicants have focused their research on a system comprising a device for location and identification with a support shaped as a mesh, tape, wire, cable, cordage, bar, tappet, line, stud, mushroom, pipe, marker, or alike as relates to the application, said support being instrumented with RFID technology, and able to supply all the items required beforehand, so as to provide high dependability of the data acquired in real time, without the need to promote destructive interventions for locating pipes, conduits, cables or buried or hidden objects in public ways, roads, streets or any other surfaces with or without finishing, where it is understood that pipes, conduits, cables or hidden or buried objects also comprises any kind of condition where originally the vision of such object is hindered, either that it is buried underground, hidden by the soil or any apparatuses, encapsulated, wrapped, hidden within walls, barriers, blocks, wells, galleries, submerged or immersed in any support or conditioning means, the use of the system not being restricted to the condition where the object to be identified is apparent or visible.

Thus, the technique still needs a device and system for location and identification of pipes, conduits, cables or buried or hidden objects without the need of an any invasive and/or destructive work, such device being instrumented based on a transponder with RFID technology being inserted in a safety and identification device with a support shaped as a mesh, tape, wire, cable, cordage, bar, tappet, line, stud, mushroom, pipe, marker or the like, the system where said device is inserted and the method for utilizing said system being described and claimed in the present application.

SUMMARY OF THE INVENTION

Broadly, the present device for location and identification of pipes, conduits, cables or buried or hidden objects without the need of any invasive and/or destructive work comprises:
  a) at least one device based on a transponder with RFID or similar identification technology without the need of physical contact or line-of-sight, said device being inserted in
  b) at least one safety and identification device with a support shaped as a mesh, tape, wire, cable, cordage, bar, tappet, line, stud, mushroom, pipe, marker or the like.

And the system for location and identification of pipes, conduits, cables or buried or hidden objects without the need of any invasive and/or destructive work comprises:

a) at least one location and identification device supported on a mesh, tape, wire, cable, cordage, bar, tappet, line, stud, mushroom, pipe, marker or the like as refers to application and instrumented with at least one transponder utilizing RFID technology or a like identification technology without the need of physical contact or line-of-sight;

b) at least one transponder reader and/or writer device; and c) at least one pipe, conduit, cable or buried or hidden object to be located, Whereby it is possible to retrieve the information from the transponder as specifications or relevant information.

Said transponder may be attached to a metallic or dielectric support device— hereinafter called Safety Tape—by melting it into the device during manufacturing, directly glued to the support, soldered, riveted, screwed, entangled, transferred by decalcomania, painted, fastened, wounded, sewed, welded or attached by means of any other fixation techniques on the support device, at the act of manufacture of the device as well as during installation of same in the field.

The transponder and the Safety Tape can have the most different shapes and sizes, being buried at different distances from the ground and submitted to the technical features offered by the RFID technology.

In this way, one aspect of the present invention is the transponder attached to the safety and identification device, independently from the variations that could be implied by the concept of the invention.

Therefore, the invention provides an instrumented device for location and identification of pipes, conduits, cables or buried or hidden objects without the need of any invasive and/or destructive work with the aid of identification technology via Radio Frequency—RFID—or the like, incorporated to a safety warning system comprising a mesh, a tape, a wire, a cable, cordage, bar, tappet, line, stud, mushroom, pipe, marker or the like normally used in installations of pipes, conduits, cables or buried or hidden objects.

The invention provides further a system for location and identification of pipes, conduits, cables or buried or hidden objects without the need of any invasive and/or destructive work comprising an identification system made up of a safety and identification device with a support in the shape of a mesh, a tape, a wire, a cable, cordage, bar, tappet, line, stud, mushroom, pipe, marker or the like instrumented with transponders using the RFID technology or a similar technology for identification without the need of physical contact or line-of-sight; a transponder reader and/or writer device; and the pipe, conduit, cable or buried object to be located.

The invention also provides a system for location and identification of buried objects without the need of any invasive and/or destructive work with the aid of identification technology by Radio Frequency—RFID—or similar identification technology without the need of physical contact or line-of-sight incorporated to a warning system enabling to implement a system for controlling, monitoring, location and checking of the specifications of pipes, conduits, cables or buried or hidden objects in building standards of transmission and distribution lines of gases, fluids, electrical energy, communications, broadcast and others which fit into this description, in urban as well as in a rural ambient, without the need of any invasive and/or destructive work (excavation) for location and identification of same.

The invention further provides a device, system and method for location and identification of pipes, conduits, or buried or hidden objects without the need of any invasive and/or destructive work with the aid of identification technology by Radio Frequency—RFID—or like identification technology without the need of physical contact or line-of-sight incorporated to a warning system of deep ecological appeal, since it reduces the probability of environmental accidents or sound or visual pollution.

The invention also provides a device, system and method for location and identification of pipes, conduits, cables or buried or hidden objects without the need of any invasive and/or destructive work with the aid of identification technology by Radio Frequency—RFID—or like identification technology without the need of physical contact or line-of-sight incorporated to a warning system which enables information to be retrieved from the transponder as specifications or relevant information, contrary to state-of-the-art devices which only identify the installed pipe, conduit or object.

The invention also provides a device, system and method for location and identification of pipes, conduits, cables or buried or hidden objects without the need of any invasive and/or destructive work with the aid of identification technology by Radio Frequency—RFID—or like identification technology without the need of physical contact or line-of-sight incorporated to a warning system where any of the devices can be replaced in case of accidental damage without loss of data when the new device is installed provided at least one of the transponders is under working conditions or that these information are stored in a data bank of the company which is in charge of the work or of the company owning the installation.

The invention also provides a device, system and method for location and identification of pipes, conduits, cables or buried or hidden objects without the need of any invasive and/or destructive work with the aid of identification technology by Radio Frequency—RFID—or like identification technology without the need of physical contact or line-of-sight incorporated to a warning system which is able to update data in the transponder memory whenever required.

The invention also provides a device, system and method for location and identification of pipes, conduits, cables or buried or hidden objects without the need of any invasive and/or destructive work with the aid of identification technology by Radio Frequency—RFID—or similar identification technology without the need of physical contact or line-of-sight incorporated to a warning system with analysis and identification of the pipes, conduits, cables or objects buried or hidden in real time or alternatively, store these data for future inquiry.

The invention also provides a device, system and method for location and identification of pipes, conduits, cables or buried or hidden objects without the need of any invasive and/or destructive work with the aid of identification technology by Radio Frequency—RFID—or like identification technology without the need of physical contact or line-of-sight incorporated to a warning system where different companies can have access to shared information in the buried pipes or conduits of other companies at low cost, the breaking of third parties pre-installed infrastructure being avoided.

The invention also provides a device, system and method for location and identification of pipes, conduits, cables or buried or hidden objects without the need of any invasive and/or destructive work with the aid of identification technology by Radio Frequency—RFID—or similar identification technology without the need of physical contact or line-of-sight incorporated to a warning system where data stored in the transponder can be cryptographed with a password for information access, so as to hinder that third parties read information critical to someone's business.

The invention provides further methods for installing said device according to specific norms, storing in said transponder information relevant to said pipe, conduit, cable or buried or hidden object, read the information in the transponder, and use said information for locating, identifying and mapping at least one pipe, conduit, cable or buried or hidden object.

The invention further provides a method for installing said device in the field, after the pipe, conduit, cable or object has been buried or hidden.

The invention also provides a method for real time reading and/or writing in the inventive device the specifications and information relevant to the buried object in the factory, as well as when installed or pre-installed in the field, where by the utilization of one or more antennas, a reading and/or writer device and the inventive device the identification, signalization and protection of pipes, conduits, cables or buried or hidden objects is made possible.

The invention also provides for a method for identification at the same time and in real time of several pipes, conduits, cables or buried or hidden objects of different proprietary companies which buried or hid the inventive device together with their pipes, conduits, cables or objects to be identified using the installation method described above, with the aid of identification technology by Radio Frequency—RFID—or like identification technology without the need of physical contact or line-of-sight incorporated to a warning system.

The invention also provides a method for the public inventory of several infra-structures buried by different gas, electricity, etc. companies, in urbanized or not zones of high or low density, which have buried the inventive device together with their pipes, conduits, cables or objects to be identified using the above described method of installation, with the aid of identification technology by Radio Frequency—RFID— or like identification technology without the need of physical contact or line-of-sight incorporated to a warning system.

The invention provides further a method for mapping and execution of as-built plants of pipes, conduits, cables or buried or hidden objects, by means of the retrieval of information contained in the transponders together with the use of a GNSS (Global Navigation Satellite System) receptor which provides latitude, longitude, and the geometrical height of the point to be georeferenced in real time or post-processed for better precision and accuracy. Such information can be processed in the field, stored in a computer for further processing or transmitted to a central database for execution of the map or of as-built plants.

BRIEF DESCRIPTION OF THE DRAWINGS

FIG. 1 attached illustrates the basic working principle of a commercial, state-of-the-art RFID device, with the writing of information and reading of same with the aid of an also commercial reader. FIG. 1A shows a general arrangement of the devices while FIG. 1B shows the direction of the energy which flows from a reader and/or writer device towards the transponder and of the data sent and received by the transponder.

DETAILED DESCRIPTION OF THE INVENTION

Figure 2:
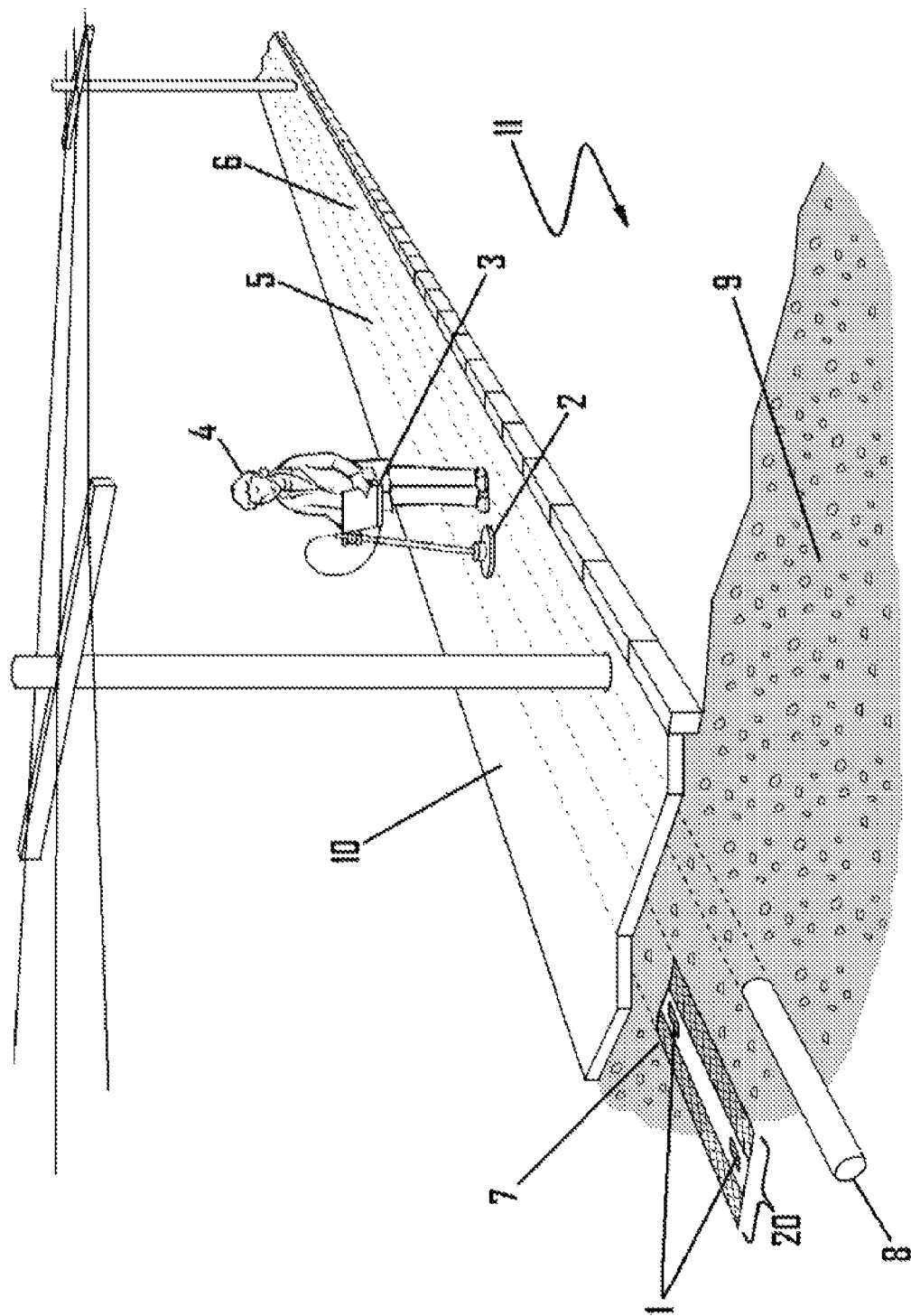
FIG. 2 attached illustrates according to the invention the way is effected the procedure of reading and/or writing information related to pipes, conduits, cables or buried or hidden objects in the instrumented location and identification device without the need of intervention by any invasive and/or destructive work.

Throughout the present specification, the expression "pipes, conduits, cables or buried or hidden objects" means pipes, conduits or objects which are buried or hidden in public ways, roads, streets or any other surfaces with or without any finishing, where it is also understood that a buried object also comprises any kind of condition where originally the said object is hidden from sight, either because it is buried underground, hidden by the ground or by any apparatuses, encapsulated, wrapped, hidden within walls, barriers, blocks, wells, galleries, submerged or immersed in any support or conditioning means, the use of the system not being restricted to the condition where the object to be identified is apparent or visible.

The following detailed description of the invention refers to the Figures which accompany the present specification. The same reference numbers in different presented illustrations identify the same devices or like substitutes, such as the utilization of passive, semi-passive or active devices for localization and identification with the use of RFID technology, also known as transponders, smart tags, instrumentation tags, Tags or markers.

Also analogously, the utilization of location and identification systems comprises the use of dedicated or commercial devices for said application of reading and/or writing of the information on buried or hidden objects, together with transponders of RFID technology or any like identification technology without the need of physical contact or line-of-sight incorporated to the proposed instrumented warning system, which can be a mesh, a tape, a cable, a wire, a cordage, a bar, a tappet, a line, a stud, a mushroom, a pipe, a marker or similar devices, which are configured for the use of one single device or combined in any possible form, manufactured from metallic or dielectric materials, without the option of instrumentation attached and commercially available as safety mesh=underground warning mesh with safety tape=underground warning tape.

It should also be understood that the following description of the presented devices does not limit the invention to only the cited technologies, the scope of the invention being determined solely by the appended claims.

The systems and methods proposed in the present invention are therefore the manufacture and utilization of a set of devices bearing wireless technology for the precise location and identification of pipes, conduits, electricity conduits, gas pipelines, petroleum pipelines, water pipelines, cables, galleries, lines in general and several buried or hidden objects, metallic as well as non-metallic, utilizing the identification technology by radio frequency or RFID or any like identification technology without the need of physical contact or line-of-sight incorporated to a visual warning system.

One example of commercial warning useful for the purposes of the present product is the object of the above-cited Brazilian application MU8003112-9, without being limited to it.

Thus, according to the first aspect of the invention, the at least one transponder with RFID or any like identification technology without the need of physical contact or line-of-sight can be incorporated to the warning system as a kind of support or protection holder against mechanical or environmental condition variations, the support being metallic or dielectric, and assuring the desired distribution of said transponders at pre-set or chosen intervals and locations for each application at the length or width of the system.

The mechanical protection as well as the protection of the location of the at least one transponder in the proposed instrumented warning system can be performed by the use of specific commercially available transponders from each manufacturer for applications under buried conditions or the like or through different, simpler forms of attachment of transponders in the warning system having specific dimensions and materials for each end application.

Useful metallic or dielectric supports for the at least one transponder are selected among at least one from a mesh, a tape, a cable, a wire, a cordage, a bar, a tappet, a line, a stud, a mushroom, a pipe, a marker or like application devices, configured for use into just a single one or several of them, combined in any way so as to form different types of warning systems.

The features of such supports are described below.

An especially useful configuration for the support device comprises a mesh and a tape.

A further useful configuration for the support device comprises a surface stud or marker.

Useful materials for the manufacture of such support or safety tape include several metallic or dielectric materials in the manufacturing process, the production of the final safety tape being not restricted to the utilization of just one material or combinations of these different materials, solutions or alloys in the production process, it being also possible to utilize glues, adhesives, fixing agents, varnish, paint, protecting agents, waterproof materials and further products which are designed to protect, to increase the useful life, signalize or identify same.

For the manufacture of this mesh useful metallic materials are selected among copper, aluminum, steel, iron and alloys among others.

Useful dielectric materials are selected among plastics, including polyurethane (PU), polyethylene (PE); polypropylene (PP), resins, polycarbonate (PC), nylon, silk, fabrics, rubbers, blankets, fibers and the like which can serve the same purpose and have different densities, compositions and industrial classifications and are commercially available.

The dimensions of the mesh meet the specifications required for each application or client, with a minimum of 0.5 cm width and maximum 2 m width, such dimensions being voluntarily altered throughout its length during the manufacturing process. Overall thickness of the tape can vary between 1 mm and up to 10 cm, according to the desired robustness for installation or handling, which can also vary along its length.

The warning mesh can contain sinuosity areas in its dimensions throughout its whole length, those being necessary as a complement of the specifications according to their application or useful life in certain areas or regions.

The mesh serving as transponder fixation and support can be formed by one single material or by using the combination of different above-cited materials, this being done through processes of hot melting, cold melting; it can be injected, trimmed, laminated, printed, pressed, woven, coiled, sewn, glued, welded, or obtained by any other manufacturing methods forming honeycomb structures or hollow spaces of geometrical or free shapes, uniform or not, periodical or not, according to the desired stiffness, visualization, finishing and durability of the said mesh.

Such honeycombs or hollow spaces forming the concept of mesh can assume areas between 1 $mm^2$ and up to 1 $m^2$, and can be built from the minimum diameter of the net wires of said mesh which has from 0.1 mm cross section up to 5 cm, according to the material chosen for the manufacture and the required robustness.

All colors of the visible spectrum can be utilized in the manufacture of the mesh, including black, with mat or glossy finishing, fluorescent, phosphorescent or sensible to UV radiation, in spite of the fact that most of the applications recommend that globally standardized warning colors be used, such as red, orange and yellow, since they provide better visualization and identification during an any invasive and/or destructive work such as an excavation or an accident.

The mesh can be manufactured from materials colored as desired or it can receive the desired colors a posterior, through painting, dyeing, galvanization, oxidation, anodization, nickel-plating, chromium-plating, and further coloring processes.

The utilized pigments can contain stabilizing agents, anti-UV additives and anti-oxidants, impermeabilization agents and solar filter, besides showing written or drawn information for the visualization of the features of the pipe, conduit, cable or buried or hidden object without equipment for radiofrequency reading or the like.

Useful materials for the manufacture of the safety or warning tape are selected among one or more of the metallic or dielectric materials utilized in the production of the mesh, it being understood that the manufacturing and coloring processes are very similar to what has been described above for the production of the safety mesh and can be applied to the safety tape as well.

The width of the tape is in the range from 0.5 cm to 1.5 m, this dimension being variable throughout its extension, as well as its thickness, which is in the range of 0.1 mm and up to 5 cm. This tape can be formed from one single layer or several layers of the material, of the same or of different materials, laminated, mechanically attached, glued, sewn, welded or any other method of attachment.

The tape can still contain visual information on its extension, expressed as symbols, descriptions or drawings on the buried objects below it, in order to quickly identify it in case of excavation without the utilization of the radiofrequency reader or the like.

The cable, wire, cordage, bar, tappet, line, stud, mushroom, pipe, marker or other devices of similar application in safety or warning also follow the same manufacturing principles, utilized materials, coloring and identification which hold for the safety mesh and tape, and can have cross sections from 1 $mm^2$ and up to 5 $cm^2$.

Such warning systems such as the mesh, the tape, the pipe, conduit, the wire, the cordage, the bar, the tappet, the line, the mushroom, the pipe, the stud, the marker or other devices of similar application can be utilized independently or through association of two or more of them, according to the specific end application. In the utilization of a warning system with two or more kinds of support and fixation devices, the manufacturing and visualization features of each one can be similar or different, those being utilized completely separated or affixed together by any means, such as for example, the utilization of the underground warning mesh together with the safety tape, where the tape and the mesh can either be independent or can be united through a melting, soldering, gluing, tightening, sewing, welding, framing, clamping process, or like ways of fixation.

In warning systems such as the bar, the tappet, the line, the stud, the mushroom, the pipe or the marker the fixation of the transponder to the system can be performed so that they make up a single or separate pieces, during the manufacturing of same or during its installation, according to the desired application and need.

The transponders are attached to the metallic or dielectric warning systems described above, the installation being possible in any one of the support or fixation devices, where in the option of warning systems with more than one support device, just one, some or all the devices can contain the transponders.

The transponders are attached to the metallic or dielectric support during the manufacturing process of same or during the process of installation or pre-installation of said support in its end application. The transponder attachment on the support device can be performed by melting the same in the device during manufacturing, or alternatively directly glued to the support, soldered, riveted, screwed, entangled, submitted to decalcomania, painted, fastened, wounded, sewn, welded or attached through any other fixation techniques on the support device, either at the moment the system is being produced or when it is installed or pre-installed in the field.

The fixation of the transponders on the metallic or dielectric support device is performed at intervals which depend on the kind and locus of application, where they can vary from 1 cm spacing for application in high density urban zones and up to 5 km for specific applications in extremely low inhabited areas of difficult access.

Useful frequency ranges for the transponders are all the frequency ranges defined by local and international standards which regulate said devices and their utilization, as well as their future updating and new regulations. Such devices can work using the magnetic or electromagnetic transmission and detection technology.

The RFID technology generates and irradiates electromagnetic fields, and as such is classified as a radio system. For this reason, the RFID system utilizes the frequencies of the industrial, scientific and medical applications, worldwide classified as ISM (Industrial Scientific Medical) frequencies. In this way, the RFID system bears spectrum ranges at low frequencies (LF), high frequencies (HW) and ultra-high frequencies (UHF).

Most transponders utilize microchips which store a serial number universally unique with additional information and belong to three categories according to the source of energy: passive, semi-passive and active, with memory or simply for location (1-bit RFID), the invention admitting the use of any of the available types of transponders. The passive transponder does not include any battery and is fed by the energy of the magnetic or electromagnetic field emitted by at least one antenna of the reader. Active transponders have their own batteries to feed all the processing, reception and transmission while the semi-passive transponders utilize energy from their own battery as well as that from magnetic or electromagnetic fields emitted by the reader at different steps of the processing.

Active transponders usually operate in frequencies around 455 MHz, 2.45 GHz and 5.8 GHz and have longer range than the passive ones. On their turn, passive transponders have lower cost, require less maintenance and can operate under LF—generally in the frequencies 124 kHz, 125 kHz and 135 kHz, HF—generally 13.56 MHz and UHF—generally between 860 MHz and 960 MHz and 2.45 GHz without being restricted to these spectral ranges.

The limiting distance of operation between the transponder and the reader can be determined by several factors such as the propagation medium, the central frequency, the transponder power supply, and the technical features of the antennas of the reader and the transponder, among others.

In case of the use of passive or semi-passive transponders, it is possible to utilize a transmitting antenna simply to excite the transponder and another antenna for transmitting and receiving data.

According to the concept of the device for location and identification object of the invention, it is possible to replace the support or mesh in case of accidental damage without loss of data in the installation of the new support provided at least one of the transponders is under working conditions or that this information is stored in a data bank of the company which is in charge of the work or of the company which owns the installation.

Alternatively, the device for location and identification itself can be replaced in case of accidental damage without loss of data in the installation of a new device provided at least one of the transponders is under working conditions or that this information is stored in a data bank of the company which is executing the work or of the company which owns the installation.

Another aspect of the invention is that the device and system which are objects of the invention enable to implement a control, monitoring, location and checking system of the specifications in real time or as a databank of pipes, conduits, cables or buried objects, under the standards of building construction, transmission lines and distribution of gases, fluids, electric energy, communications, broadcast and so on which fit this description, in urban as well as in rural environments, without the need to intervene through an any invasive and/or destructive work (excavation) for location and identification of same.

The use of a mesh, tape, cable, wire, cordage, bar, tappet, line, stud, mushroom, pipe, marker or other safety devices instrumented with RFID technology or any like identification technology without the need of physical contact or line-of-sight coupled to a reader and/or writer, antenna and energy being transmitted to a transponder and receiving an answer-back transmission, assures the advantage cited above, it being possible through the reading and writing of information relevant to the buried or hidden system of transmission or distribution in the transponders incorporated to the mesh, without the need of physical contact or line-of-sight between the reader and/or writer and the transponder, through the emission of magnetic or electromagnetic fields of the surface and the writing of the data stored in the mesh and transmitted to the same surface.

The invention will now be illustrated by the following Figures, which should not be considered as limiting of same.

In FIG. 1A, which is a state-of-the-art illustration of the basic operation principle of the devices bearing RFID technology or any like identification technology without the need of physical contact or line-of-sight, it is seen a reader and/or writer unit 3, which can be mobile or fixed and is responsible for the reading and/or writing of data in transponders 1 through emission of directioned or isotropic magnetic or electromagnetic fields and at specific frequencies through their internal or external antenna 2 for exciting and transmitting data 13 towards said transponders 1 so that those can send the data stored in their memory towards reader 3 or receive new information from it. The transmission medium can be free space 15 or even the ground 9. In FIG. 1B, an energy transmission diagram demonstrates the direction of propagation of the electromagnetic waves responsible for the excitation of said transponder 1 as energy 12 and by transmission of data 13 from the memory of the devices which one intends to write or read.

In FIG. 2, which illustrates one mode of the present invention, it can be seen that the device 20 for location and identification which is illustrated in the Figure as an instrumented safety mesh is being used for the precise location and identification of pipes, conduits, cables or buried or hidden objects without the need to perform excavations or checking of the public way, reducing the time of the work to be done and avoiding any risk to the existing lines placed near the underground, including lines belonging to other companies which are already placed in the same location.

In FIG. 2 it is possible to observe the array of several transponders 1 throughout the length of the installed mesh 7, forming device 20, antenna 2 which directionates electromagnetic waves at the frequency specified for transponders 1, the reader and/or writer 3 of the information in the memory of transponders 1, human operator 4 of the identifying system effecting the reading or the writing of information on the line placed close to instrumented mesh 7, the continuity reference 5 which illustrates the place where is buried the safety and identification device 20, the continuity reference 6 which illustrates where is buried or hidden the pipe, conduit, cable or object 8 under question, the pipe 8 to be protected, previously buried close to device 20, the soil 9 in its natural state or embanked, the intact public way 10 and street level 11 as depth reference.

Figure 3:
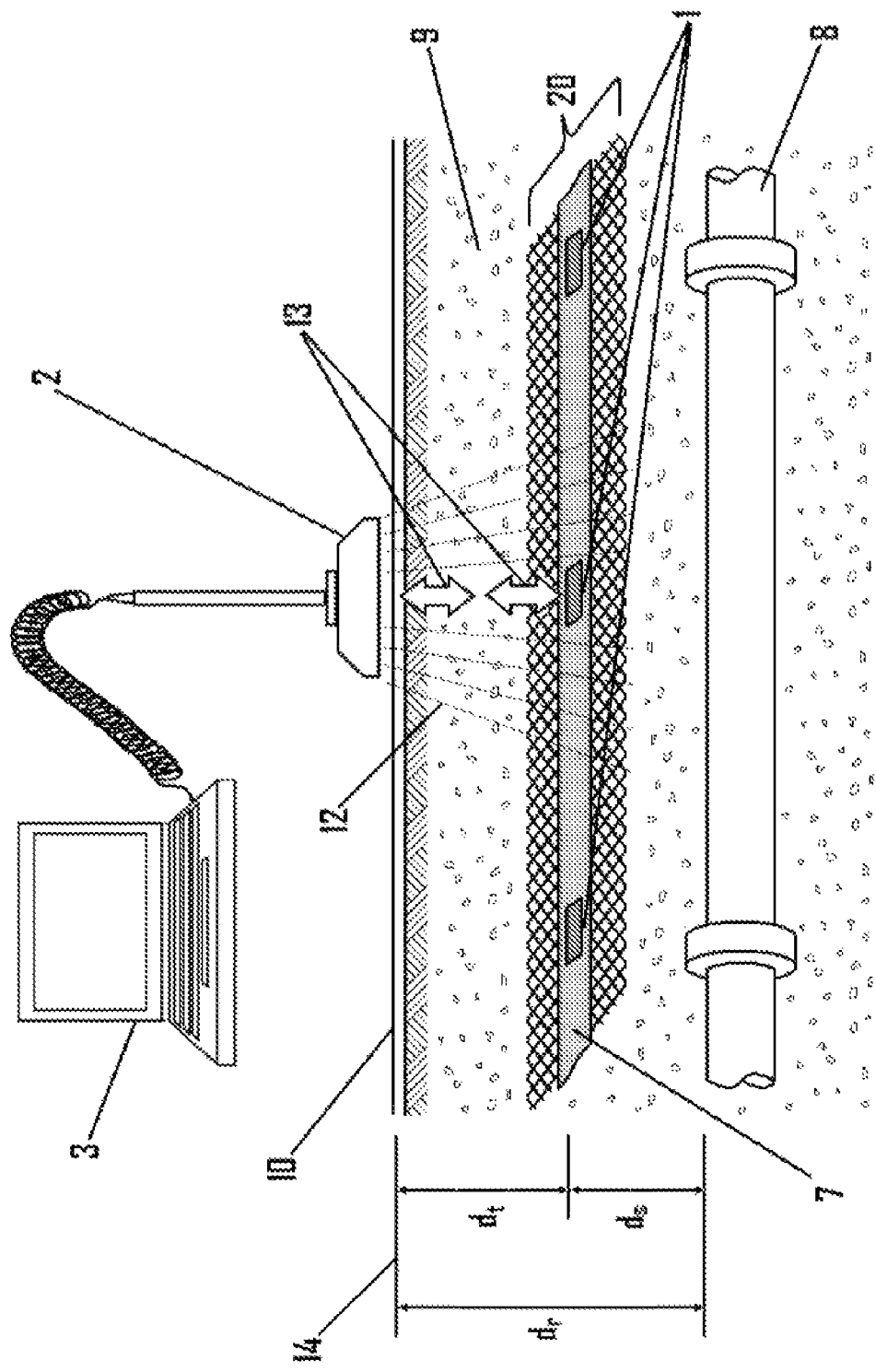
FIG. 3 attached shows in detail the working principle of the RFID devices or of any like technology incorporated to the instrumented safety tape according to the invention.

In FIG. 3, also according to the invention is presented a more detailed view of the method for location and identification of the features of a buried pipe 8 through data written in the memory of transponders 1 installed in safety and identification device 20 which is represented as an example of an instrumented safety mesh 7. Also observed are a reader and/or writer 3 of the information of the memory of transponders 1, antenna 2 which directs the magnetic or electromagnetic fields in the specified frequency towards installed transponders 1, electromagnetic waves 12 transmitted to the ground, the sending of information 13 stored in transponders 1 of the support and fixation device 7, as well as the main features of the as-built plant: kind of pipe, conduit or cable, material, product which transports or packs, depth, company in charge of the pipe, conduit or cable, safety information, age, validity, among others.

It is also possible to notice safety mesh 7 instrumented either with transponders 1 or with safety and identification device 20, buried with its transponders 1 installed along its extension, the spatial disposition of said transponders 1 throughout said mesh, the pipe, conduit, cable or buried or hidden object 8 to be protected, the level of the public way 10, the ground 9 of different compositions and compactions and the distances 14 normalized for each kind of pipes installation in urban areas, where $d_t$ is the distance from the surface up to safety mesh, $d_s$ is the safety distance between mesh 7 (or device 20) and pipe, conduit, cable or buried or hidden object 8 and $d_r$ is the actual distance between the surface and pipe, conduit, cable or buried or hidden object 8.

Figure 4A:
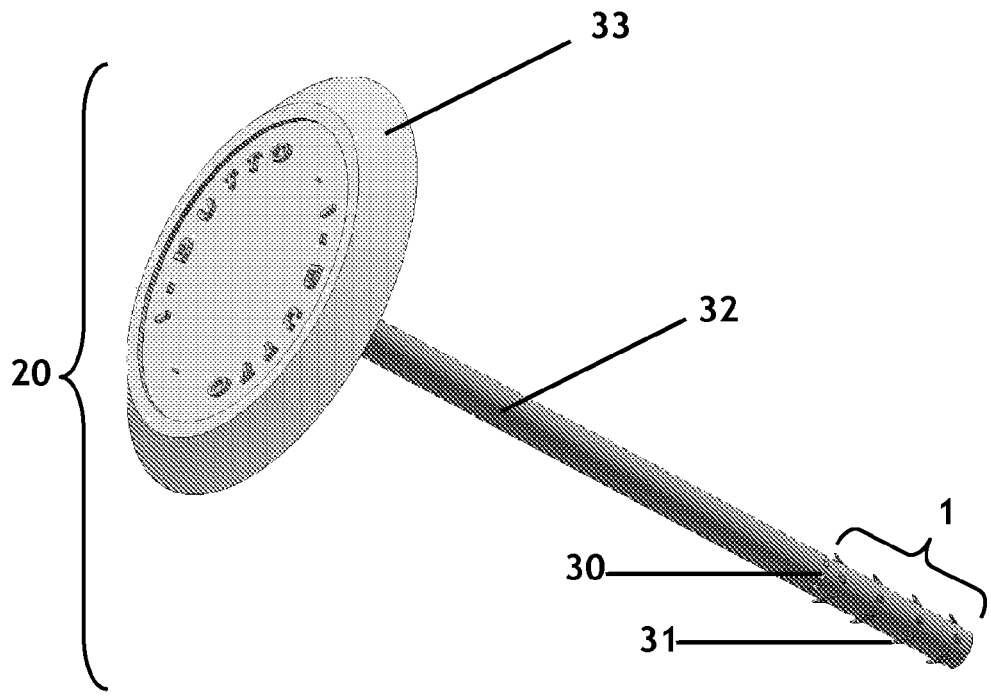
FIG. 4A demonstrates the inventive device configured with the transponder welded to the support while FIG. 4B demonstrates two methods of utilization, one with the device being installed in the complete configuration and another one the transponder only.

FIG. 4A illustrates a mode of the invention involving the utilization of identification/location devices 20 selected among a bar, a tappet, a line, a stud, a mushroom, a pipe, or a marker, not being limited to those, which can be used in new or pre-existing conduit, cable or pipes or hidden object 8 without the need of any excavation for their application. This Figure shows an application, which should not be considered as being restricted to this configuration, of identification/location device 20 of the asphalt stud kind instrumented with marker 33 for visual identification above the surface, where at the end of underground rod 32 of identification/location device 20, transponder 1 is attached with the aid of weld 30, said transponder being provided with hook-shaped burrs 31 so that during installation weld 30 is broken making possible to physically separate transponder 1 and rod 32. In this way, even through the accidental or on purpose removal of support device 32/33, transponder 1 keeps installed and correctly fixed at its location since its displacement is blocked by the said hook-like burrs 31.

Figure 4B:
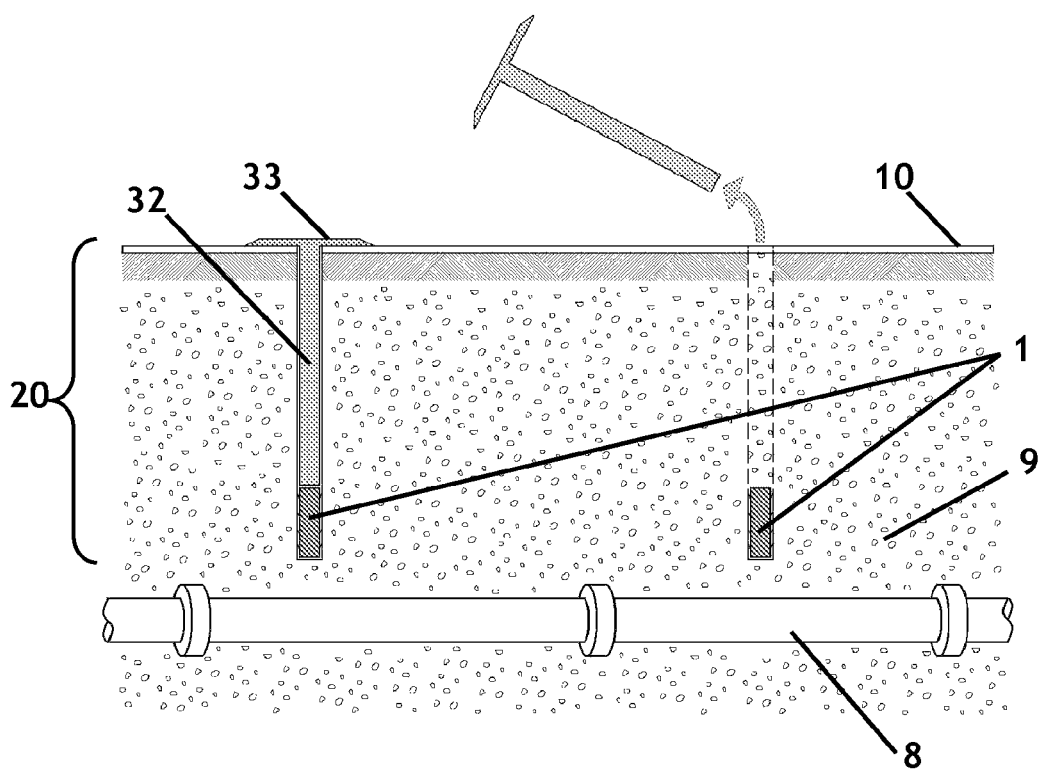
FIG. 4 attached illustrates another mode of the invention with the installation and working of a stud which instrumented with the RFID technology.

In FIG. 4B the method of utilization of device 20 is observed in a complete configuration, where, in the installation, weld 30 between support device 32/33 and transponder 1 has been broken. Also, in a more economical configuration or one that dispenses with any visual warning 33 at the surface, where only transponder 1 can be utilized through a non-represented installation tool of similar shape to the asphalt stud, but that can be reutilized and easily removed after the positioning of transponder 1 in the desired location.

According to the invention, the transmitting of the magnetic and electromagnetic fields can be in the mode of reduced directivity in order to make easier the first location of the buried object without much precision and further adjusted towards a highly directive mode for precise location and identification through reading of data from safety and identification device 20, according effectively to the pertinent need at the moment of the location or identification.

A further aspect of the invention is a system for the precise location and identification of buried or hidden objects.

The said system for locating and identifying pipes, conduits, cables or buried or hidden objects 8 without the need of any invasive and/or destructive work incorporates all the devices required for the execution of said tasks, said system comprising a reading and/or writing unit 3 for reading information on the pipe, conduit, cable or buried or hidden object 8 coupled to at least one antenna 2 provided with gains, directivity and polarization which are specific for each application, and location and identification device 20, formed by transponders 1 and a support and fixation device 7 which can be a mesh, tape, wire, cordage or alternatively a device 32/33 such as a bar, tappet, line, stud, mushroom, pipe, marker or any other device attending to the same purposes.

Further, the system demonstrates an interface 15 for wave propagation without guidance, which is characteristic of the wireless technology systems, with energy 12 being transmitted from antenna 2 for exciting the location and identification device 20 while said device sends an answerback transmission or receives data 13 related to the information on the buried objects 8, such data being then read by the reading and/or writing unit 3 or written in transponder 1.

Alternatively the transmission medium is the soil 9 in its natural state or embanked. Still alternatively the said transmission medium is concrete, asphalt, stone, sand, masonry and the like where the pipe, conduit, cable or object 8 to be identified is hidden. And the transmission medium can also result from the combination of one or more of said media or interfaces.

Still another aspect of the invention is a method for installing the said device 20 according to specific norms, said method comprising storing information relative to buried object 8 in said transponder 1, reading the information in said transponder 1 and using said information for locating, identifying and mapping said pipe, conduit or buried or hidden object 8.

Still another aspect of the invention is a method for installing device 20 in the field after the installation of the pipe, conduit, cable or object 8. Said object should have been previously placed at a depth dr relative to the surface level. Then, this same pipe, conduit, cable or object 8 should be buried under a layer of soil, sand, crushed rock, gravel or like material utilized in landfarming, up to distance $d_s$ following safety norms and installation for each application. Then, device 20 is placed on said first embankment following the path of the pipe, conduit, cable or object 8 in a continuous form or not, being naturally positioned at said distance $d_s$ relative to the pipe, conduit, cable or object 8 and at a distance $d_r$ relative to the surface. The pipe, conduit, cable or object 8 and device 20 will be embanked again up to the soil 9 level, the soil being then ready to receive the finishing of the civil work.

Device 20 requires that the information on the specification or other information relevant to the installation and safety be written in transponder 1 memory; such information can be written or altered in the production line of device 20 or in the very place of the installation work, during it or after it is finished.

Said system enables to alter data stored in the transponders 1 memory whenever necessary, either by updating new functionalities to device 20 or by altering features which are relevant to the pipe, conduit, cable or object 8 or installation.

For the writing process of the at least one transponder 1 of device 20 already installed or in the factory, it is possible to utilize a transmitting antenna 2 for exciting transponder 1 and a further antenna 2 for transmitting and receiving data or simply utilizing an antenna 2 for the two functions.

As a locating method of the pipe, conduit, cable or object 8 through the functionalities of device 20, devices 2 and 3 should be associated, and for the sake of simplification and for making easier the first location, antenna 2 can be of low directivity, and after having the first idea of the location of object 8 it is possible to replace said antenna 2 by one or more antennas 2 of higher directivity in order to increase precision in the location of pipe, conduit, cable or buried or hidden object 8.

As a method for the identification of the pipe, conduit, cable or buried or hidden object 8 through the functionalities of device 20, it is understood that the information contained in the memory of at least one transponder 1 incorporated to safety device 7 should be rightly read, where devices 2 and 3 should be used in association, with the utilization of one or more antennas 2 at the same time or not, of different directivities and features according to the kind of soil, depth of device 20, reading and writing features of transponder 1, power of the reader and/or writer 3, kind and amount of antennas 2 which are utilized and system operation frequency.

The method for location and reading of the relevant information to the pipe, conduit, cable or object 8 contained in the memory of transponders 1 of device 20 is carried out without any need of physical contact or line-of-sight between device 20 and antenna 2 which serves as an interface for device 3 of the system. Thus, upon approaching antenna 2 to the soil, magnetic or electromagnetic fields propagate towards transponders 1 incorporated to device 7 and the same answerback the information contained in their memory with the aid of the wireless technology. System operator 4 has only to move antenna 2 on the soil to read or store the collected data, the method being totally non-destructive.

One additional feature of the said method is that alternatively the pipe, conduit, cable or buried or hidden object 8 to be identified is in an apparent or visible condition.

Still one aspect of the invention is a method for reading and/or writing in device 20 in real time the specifications and information relevant to said pipe, conduit, cables or buried or hidden object 8 it be either in the factory as well as when installed or pre-installed in the field, where by the utilization of devices 2 and 3 and of device 20 it is possible to identify, signal and protect the pipes, conduits, cables or buried or hidden objects 8.

Another aspect of the invention is a method for identifying at the same time and in real time several pipes, conduits, cables or buried or hidden objects 8 of different proprietary companies which buried device 20 together with their pipes, conduits, cables or buried or hidden objects 8 to be identified using the method of installation described above, the method using the RFID identification technology or any like identification technology without the need of physical contact or line-of-sight incorporated to a signaling system which is the support and fixation device, mesh 7.

A further aspect of the invention is a method for mapping and execution of as-built plants of pipes, conduits, cables or buried or hidden objects 8 by the reading of the information contained in the at least one transponder 1 together with the utilization of a GNSS (Global Navigation Satellite System) receiver which provides latitude, longitude and the geometric height of the point to be georeferenced in real time or post-processed to improve precision and accuracy. Such information can be processed in the field, stored in a computer for further processing or either may be transmitted to a centralized database for execution of the map or as-built.

As competitive advantages of the present device, system and method, it is possible to list:

Speed in the survey and identification of the features of pipes, conduits, cables or buried or hidden objects of different companies in urban environments, dispensing with any invasive and/or destructive work in the location of the pipes identification;

Some administrations already require the installation of simple safety mesh (not instrumented) for certain urban applications;

Ecological appeal, since it reduces the possibilities of environmental accidents or sound and visual pollution;

Safer and quicker way for the administration to be informed on the buried pipes existing in a town;

The identification and location device or a portion of it can be replaced in case of accidental damage without loss of the data in the new device provided at least one of the transponders is in condition of use or that such information is stored in a data bank of the company executing the work or of the company proprietary of the installation;

Whenever required, possibility to update data in the memory of the transponders of the identification and location device;

Reading of the data in the identification and location device throughout the surface by low-qualified personnel;

Low installation cost and maintenance cost nearly null, equivalent to that of present non-instrument meshes;

Analysis and identification of the pipes, conduits, cables or buried or hidden objects in real time;

Different companies can read common-shared information in pipes, conduits, cables or hidden or buried objects of other companies at low cost, avoiding breaking others infra-structure; and Widely spread and tested RFID technology.

We claim:

1. A device 20 for location and identification of new or pre-existing hidden objects 8 buried in soil 9 covered by surface 10, wherein said device comprises:

a transponder 1; and a support 32, 33, wherein said transponder 1 is i) attached to the lower end of support 32, 33 with the aid of weld 30; and ii) provided with hook-shaped burrs 31, whereby the location and the identification of said hidden objects 8 is performed without the need of any excavation of said surface 10 or said soil 9.

2. The device according to claim 1, wherein the support 32, 33 is shaped as a bar, a tappet, a line, a stud, a mushroom, a pipe or a marker.

3. The device according to claim 1, wherein after installation, marker 33 is configured to stand as a visual warning on surface 10.

4. The device according to claim 1, wherein during the installation of said device 20, the weld 30 is configured to be broken so as to physically separate said transponder 1 and said support 32, 33.

5. The device according to claim 4, wherein following the separation of said support 32, 33 and said transponder 1, with removal of said support 32, 33, said transponder is kept operating in its location without any displacement with the aid of burrs 31.

* * * * *